(12) United States Patent  (10) Patent No.: US 7,603,135 B2
Takaki                          (45) Date of Patent:     Oct. 13, 2009

(54) MOBILE COMMUNICATIONS SYSTEM, METHOD OF CONTROLLING THE TRANSMISSION POWER IN THE SYSTEM, AND MOBILE STATION IN THE SYSTEM

(75) Inventor: Tetsuya Takaki, Tokyo (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 11/177,417

(22) Filed: Jul. 11, 2005

(65) Prior Publication Data

US 2006/0014558 A1    Jan. 19, 2006

(30) Foreign Application Priority Data

Jul. 13, 2004    (JP)    .............................. 2004-205335

(51) Int. Cl.
*H04B 1/00*        (2006.01)
(52) U.S. Cl. ........................... 455/522; 455/69; 370/342
(58) Field of Classification Search .................. 455/522
See application file for complete search history.

(56) References Cited

U.S. PATENT DOCUMENTS

| 5,566,165 | A | * | 10/1996 | Sawahashi et al. | .......... 370/342 |
| 5,623,486 | A | * | 4/1997 | Dohi et al. | .................. 370/342 |
| 5,982,760 | A |   | 11/1999 | Chen | |
| 6,034,952 | A | * | 3/2000 | Dohi et al. | .................. 370/335 |
| 6,035,210 | A | * | 3/2000 | Endo et al. | .................. 455/522 |
| 6,088,324 | A | * | 7/2000 | Sato | ............................ 370/203 |
| 6,101,179 | A | * | 8/2000 | Soliman | ....................... 370/342 |
| 6,275,711 | B1 | * | 8/2001 | Yamada et al. | .............. 455/522 |
| 6,298,242 | B1 | * | 10/2001 | Schiff | ......................... 455/522 |
| 6,334,047 | B1 | * | 12/2001 | Andersson et al. | ............ 455/69 |
| 6,449,623 | B1 | * | 9/2002 | Bohannon et al. | ........... 707/202 |
| 6,529,482 | B1 | * | 3/2003 | Lundby | ....................... 370/252 |
| 6,587,687 | B1 | * | 7/2003 | Wiedeman | .................. 455/428 |
| 6,597,923 | B1 | * | 7/2003 | Vanghi et al. | ............... 455/522 |
| 6,621,804 | B1 | * | 9/2003 | Holtzman et al. | ........... 370/329 |
| 6,622,023 | B2 | * | 9/2003 | Chheda | ....................... 455/522 |
| 6,628,732 | B1 | * | 9/2003 | Takaki | ......................... 375/345 |
| 6,741,867 | B1 | * | 5/2004 | Tetsuya | ...................... 455/522 |

(Continued)

FOREIGN PATENT DOCUMENTS

EP    1 067 708 A1    1/2001

(Continued)

*Primary Examiner*—Duc Nguyen
*Assistant Examiner*—Hai V Nguyen
(74) *Attorney, Agent, or Firm*—Foley & Lardner LLP (57)    ABSTRACT

A mobile station is for use in a code-division multiple-access communications system. The mobile station includes: a detection unit for receiving a signal transmitted from a base station and including a transmission-power control signal and for detecting an error in a downlink for the signal received; an extraction unit for extracting transmission-power control information from the signal received; and a mobile-station transmission-power control unit that receives a result of error detection performed by the detection unit and the transmission-power control information and controls the transmission power of a radio transmission unit of the mobile station. The mobile-station transmission-power control unit controls the radio transmission unit of the mobile station in accordance with the result of error detection, referring to the transmission-power control information, a history of an uplink transmission power for immediately preceding m frames and a history of the transmission-power control information for immediately preceding n frames.

18 Claims, 8 Drawing Sheets

U.S. PATENT DOCUMENTS

| | | | |
|---|---|---|---|
| 6,760,587 B2 * | 7/2004 | Holtzman et al. | 455/436 |
| 6,775,543 B2 | 8/2004 | Itazu et al. | |
| 6,904,013 B2 * | 6/2005 | Skoog et al. | 370/217 |
| 6,907,260 B1 | 6/2005 | Tsunehara et al. | |
| 6,912,403 B2 * | 6/2005 | Ahmad et al. | 455/522 |
| 6,944,470 B2 * | 9/2005 | Qian et al. | 455/522 |
| 6,963,753 B1 * | 11/2005 | Hamabe | 455/522 |
| 6,976,138 B2 * | 12/2005 | Suzuki et al. | 711/157 |
| 6,985,752 B2 * | 1/2006 | Takano et al. | 455/522 |
| 7,010,318 B2 * | 3/2006 | Chang et al. | 455/522 |
| 7,010,319 B2 * | 3/2006 | Hunzinger | 455/522 |
| 7,027,829 B1 * | 4/2006 | Laakso et al. | 455/522 |
| 7,075,905 B2 * | 7/2006 | Chen et al. | 370/318 |
| 7,096,034 B2 * | 8/2006 | Zhang et al. | 455/522 |
| 7,130,663 B2 * | 10/2006 | Guo | 455/562.1 |
| 7,162,262 B2 * | 1/2007 | Jonsson et al. | 455/522 |
| 7,185,256 B2 * | 2/2007 | Miki et al. | 714/751 |
| 7,200,127 B1 * | 4/2007 | Lee et al. | 370/335 |
| 7,212,823 B2 * | 5/2007 | Granzow et al. | 455/450 |
| 7,218,623 B1 * | 5/2007 | Proctor, Jr. | 370/335 |
| 7,274,947 B2 * | 9/2007 | Koo et al. | 455/522 |
| 7,277,709 B2 * | 10/2007 | Vadgama | 455/453 |
| 7,292,874 B2 * | 11/2007 | Cave et al. | 455/522 |
| 7,299,402 B2 * | 11/2007 | Soong et al. | 714/807 |
| 7,310,499 B2 * | 12/2007 | Magnusson et al. | 455/69 |
| 7,437,172 B2 * | 10/2008 | Chen et al. | 455/522 |
| 7,474,901 B2 * | 1/2009 | Ahn et al. | 455/522 |
| 7,493,134 B2 * | 2/2009 | Shinozaki | 455/522 |
| 2002/0002062 A1 | 1/2002 | Itazu et al. | |
| 2002/0053052 A1 * | 5/2002 | Suzuki et al. | 714/702 |
| 2002/0065116 A1 * | 5/2002 | Chen et al. | 455/570 |
| 2002/0136193 A1 * | 9/2002 | Chang et al. | 370/347 |
| 2003/0002462 A1 * | 1/2003 | Tanoue | 370/335 |
| 2003/0083082 A1 * | 5/2003 | Lundby | 455/501 |
| 2003/0131299 A1 * | 7/2003 | Ahn et al. | 714/748 |
| 2003/0161285 A1 * | 8/2003 | Tiedemann et al. | 370/332 |
| 2004/0106426 A1 * | 6/2004 | Koo et al. | 455/522 |
| 2004/0203463 A1 * | 10/2004 | Chen et al. | 455/67.13 |
| 2004/0266473 A1 | 12/2004 | Tsunehara et al. | |
| 2005/0136960 A1 * | 6/2005 | Timus et al. | 455/522 |
| 2005/0136961 A1 * | 6/2005 | Simonsson et al. | 455/522 |
| 2005/0143120 A1 * | 6/2005 | Cave et al. | 455/522 |
| 2005/0221833 A1 * | 10/2005 | Granzow et al. | 455/450 |
| 2005/0239489 A1 * | 10/2005 | Qian et al. | 455/522 |
| 2005/0276248 A1 * | 12/2005 | Butala et al. | 370/332 |
| 2006/0014558 A1 * | 1/2006 | Takaki | 455/522 |
| 2006/0035660 A1 * | 2/2006 | Anderson | 455/522 |
| 2006/0046767 A1 * | 3/2006 | Hunzinger | 455/522 |
| 2007/0291870 A1 * | 12/2007 | Ponnekanti | 375/295 |
| 2008/0025264 A1 * | 1/2008 | Willenegger et al. | 370/333 |
| 2008/0057994 A1 * | 3/2008 | Duan et al. | 455/522 |
| 2008/0075030 A1 * | 3/2008 | Timus et al. | 370/311 |
| 2008/0132267 A1 * | 6/2008 | Cave et al. | 455/522 |

FOREIGN PATENT DOCUMENTS

| | | |
|---|---|---|
| EP | 1 156 602 A1 | 11/2001 |
| JP | 2000-244391 A | 9/2000 |
| JP | 2002-016544 A | 1/2002 |
| JP | 2003-143071 A | 5/2003 |

* cited by examiner

MOBILE COMMUNICATIONS SYSTEM, METHOD OF CONTROLLING THE TRANSMISSION POWER IN THE SYSTEM, AND MOBILE STATION IN THE SYSTEM

BACKGROUND OF THE INVENTION

1. Field of the Invention

The present invention relates to a mobile communications system, a method of controlling the transmission power in the system, and a mobile station in the system, and more particularly, to a mobile communications system using code-division multiple access (CDMA), a method of controlling the transmission power in the system, and a mobile station for use in the system.

2. Description of the Related Art

CDMA is a method in which data is transmitted in the same frequency band and at the same time and is divided into parts in accordance with the spectrum-spread codes allocated to users. If CDMA is employed in a mobile communications system, the base station and mobile stations share the same frequency band, and the mobile stations have different spread codes allocated to them, respectively. Thus, communication can be achieved between the mobile stations.

The signal that the base station receives via the uplink extending from any mobile station to the base station is a composite signal that consists of the signals transmitted from all mobile stations existing in a specific area. In CDMA, the composite signal is subjecting to despreading that uses spread codes unique to the respective mobile stations, thereby dividing the composite signal into signals transmitted from the respective mobile stations as an output of a correlator of a receiver provided in the base station.

In CDMA using the direct spread method, however, the cross-correlation value for the spread codes to be allocated to any mobile station cannot be zero (0). Inevitably, the cross-correlation value may increase due to the influence that a signal from a mobile station near the base station imposes on a weak signal from a mobile station remote from the base station. In this case, the correlator of the receiver provided in the base station is going to be in synchronization with a signal of large cross-correlation value, because the receiver must receive signals from remote stations. Consequently, no data communication is possible between the base station and any remote station. This fault resulting from the distance between the base station and any remote mobile station is known as "near-far problem."

To solve the near-far problem, a power-controlling method is performed to control the transmission power in each mobile station. That is, the base station generates control signals for controlling the transmission powers of the mobile stations, respectively. The control signals are transmitted to the mobile stations, so that the mobile stations may receive signals at the same level, no matter whether they are close or remote to the base station.

The control of transmission power in the uplink is a closed-loop transmission power control. In this control, the receipt SIR (Signal-to-Interference Ratio) concerning any mobile station is measured in the base station. The receipt SIR is compared with the target SIR (T-SIR). If SIR is smaller than the target SIR, the base station transmits an up-command to the mobile station as a transmission power control command (TPC command). If SIR is equal to or lager than the target SIR, the base station transmits a down-command to the mobile station as a TPC command. In accordance with the up-command or down-command, the closed-loop transmission power control is performed in the mobile station to control the transmission power.

SIR is the ratio of the interference wave to the desired signal. For the signal that the base station receives from a mobile station M(i), SIR is the ratio between the desired signal S(i) obtained through the despreading using the spread code of the mobile station M(i) and the sum of the interference waves obtained by inversely spreading the spread spectra from the other mobile stations by applying the spread code of the mobile station M(i). Even if SIR remains unchanged, the signal received may change in reception quality, depending on the transmission environment factors, such as number of transmission paths, the moving speed of the mobile station. Hence, the target SIR, i.e., reference SIR, is corrected at long intervals, in accordance with the quality of the signal received, which is measured for a relatively long period. That is, the base station increases T-SIR for each mobile station if the quality of the signal received from the mobile station is poor, and decreases T-SIR if the quality of the signal received is no longer poor and stable for a prescribed period. Since T-SIR is thus controlled, data can be transmitted at minimum power and the base station can have a large signal-receiving capacity.

JP-A-2000-244391 discloses such a method of controlling transmission power as described above in conjunction with the prior art (see FIGS. 29 and 32). To facilitate the understanding of the present invention, the prior art will be described in detail, with reference to the method disclosed in the publication.

Figure 9:
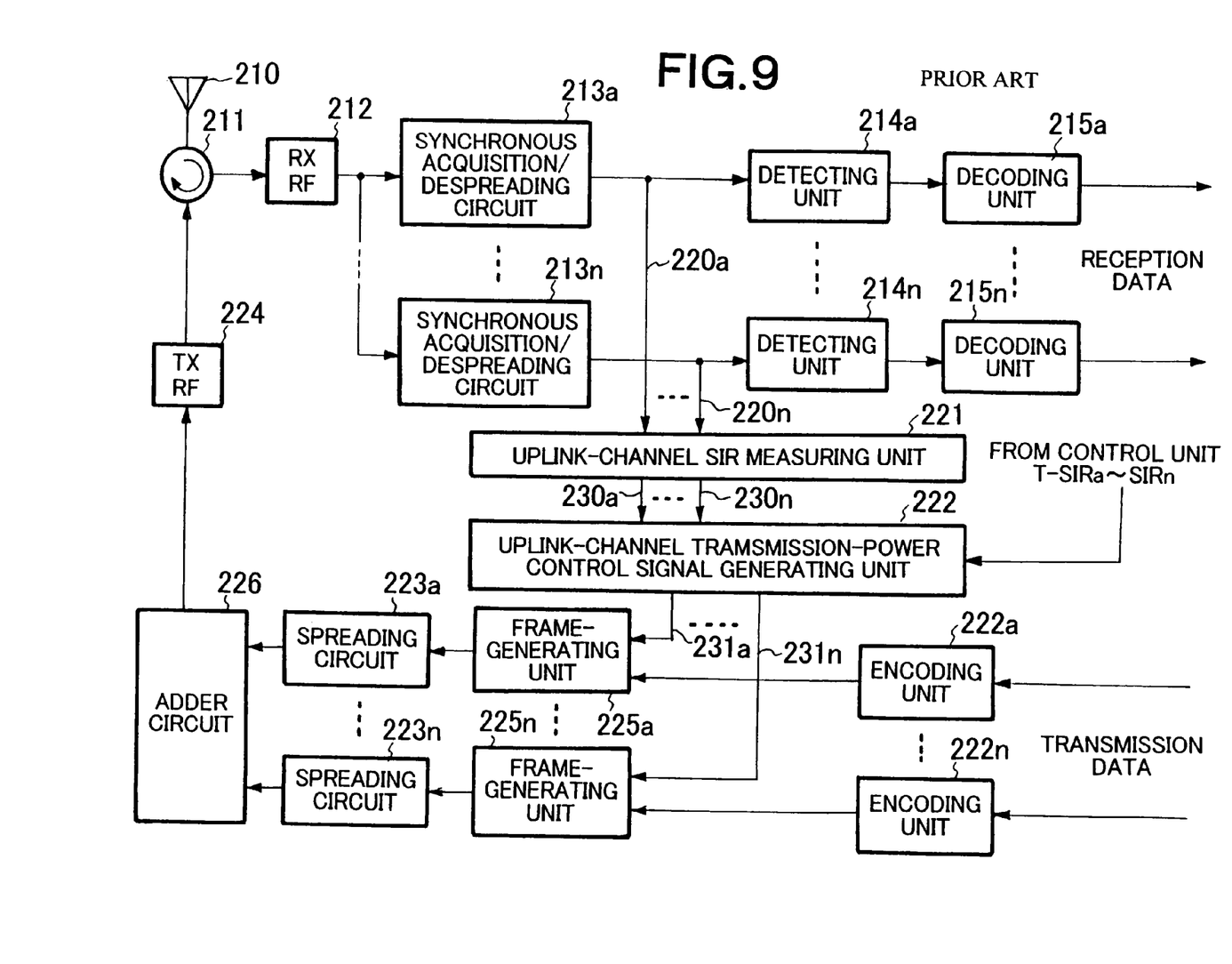
FIG. 9 is a block diagram of a base station well known hitherto.
Figure 10:
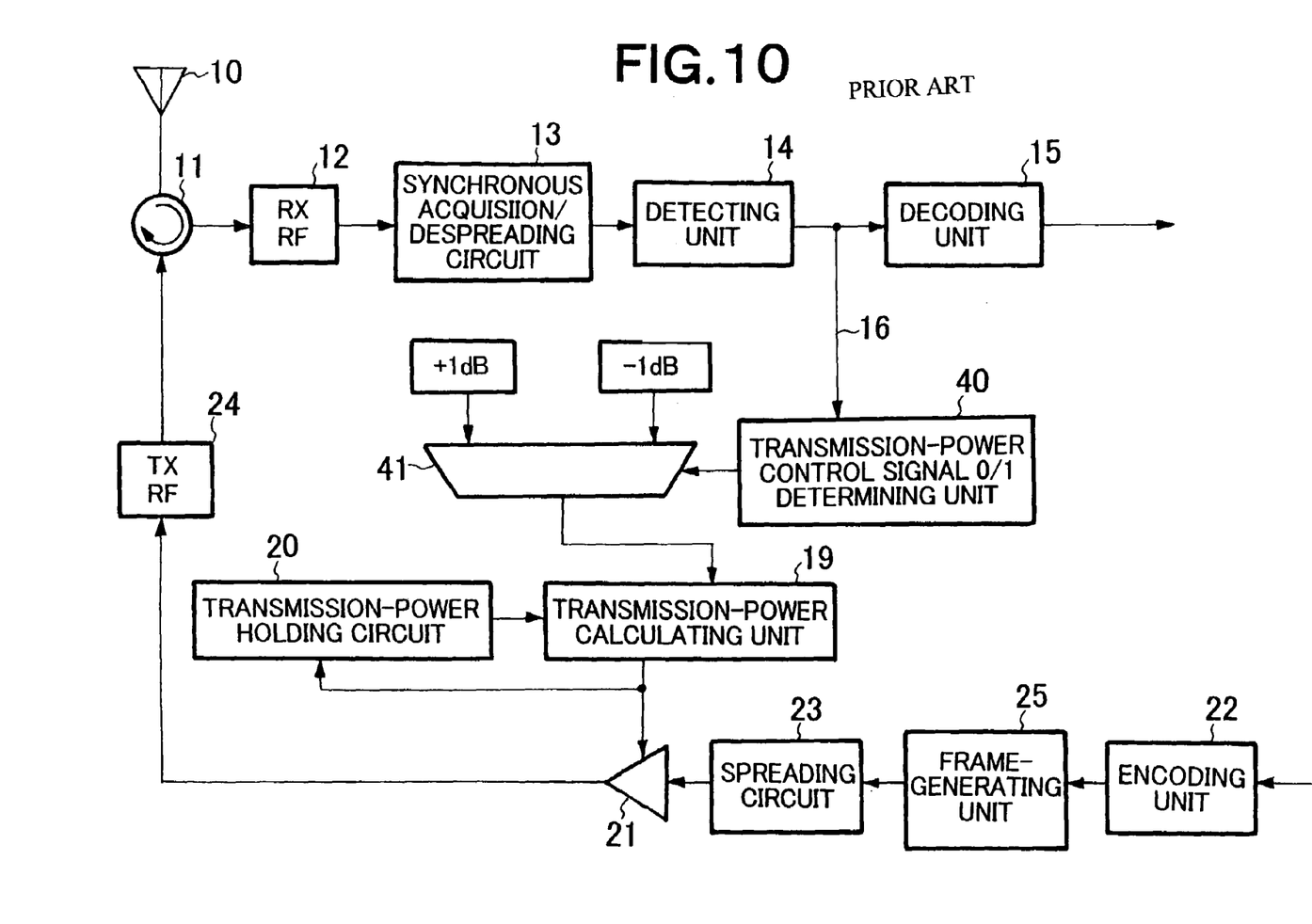
FIG. 10 is a block diagram of a conventional mobile station.

FIGS. 9 and 10 show the base station and one of mobile stations, respectively, which are provided in a CDMA mobile communications system that is disclosed, as prior art, in the above-identified publication. As shown in FIG. 9, the base station BS receives radio waves transmitted from the mobile stations MSa to MSn that exist in an area. In the base station BS, a receiving radio module 212 demodulates a base-band signal and performs a receiving process at high/intermediate frequencies. Synchronous acquisition/despreading circuits 213a to 213n perform synchronous acquisition and despreading, using the spread codes allocated to the respective mobile stations MSa to MSn. An uplink-channel SIR measuring unit 221 measures the SIRs of the signals transmitted from the mobile stations. An uplink-channel transmission-power control signal generating unit 222 compares the SIR of each mobile station with T-SIR (reference SIR) thereof, generating transmission-power control signals TPCa to TPCn for the respective mobile stations. Frame generating units 225a to 225n generates frames from the data signals encoded by encoding units 222a to 222n. Spreading circuits 223a to 223n spread the frames, by using the spread codes unique to the respective mobile stations. An adder circuit 226 adds the frames, generating a composite signal. The composite signal is modulated, frequency-converted and amplified by a transmitting radio module 224. The composite signal thus processed is transmitted from the antenna 210 to the mobile stations. Each transmission-power control signal is a signal that instructs the mobile station to decrease the transmission power at TPCi=0, if SIRi is equal to or larger than T-SIRi, and increase the transmission power at TPC =1, if SIRi is smaller than T-SIRi.

In the mobile station MSi shown in FIG. 10, a receiving radio module 12 receives radio waves from the base station, demodulates a base-band signal and performs a receiving process at high/intermediate frequencies. A synchronous acquisition/despreading circuit 13 performs synchronous acquisition and despreading on a signal, in which the spectra of a plurality of channels overlap one another, by using the spread code allocated to the mobile station. A detecting unit 14 carries out a wave-detecting process such as compensation for phase rotation. A decoding unit 15 performs an error-controlling process. The data obtained is used as received data. A transmission-power control signal received at the detecting unit 14 is input to a transmission-power control signal determining unit 40. The unit 40 determines whether the control signal is "1" or "0." If the control signal is "1," a selector 41 selects +1 db. If the control signal is "0," the selector 41 selects −1 db. The selector 41 generates a control signal that represents a value by which the transmission power should be changed. This control signal is output to a transmission-power calculating unit 19. The unit 19 calculates an updated transmission power from the value and the transmission power now held in a transmission-power holding circuit 20. Meanwhile, an encoding unit 22 performs a correction-control process on the data to be transmitted. A frame-generating unit 25 generates a frame of a predetermined format. A spreading circuit 23 performs a spreading process, using the spread code unique to the mobile station. The resultant data is supplied to a variable amplifier 21. The variable amplifier 21 amplifies the signal to be transmitted, at such an appropriate gain that the data may be transmitted at the transmission power thus designated.

The control of the transmission power as described above enables the mobile station to transmit data at appropriate power in accordance with the transmission-power control signal, if the mobile station receives the transmission-power control signal from the base station without errors. In the CDMA mobile communications system, however, reception errors may occur in the downlink even if the reception electric field is relatively intense, inevitably because interference waves influence the mobile stations, too. In this case, the transmission-power control signal sent from the base station is demodulated by error. When this erroneous control signal controls the transmission power of the transmitter provided in the mobile station, the CDMA mobile communications system is no longer stable. This may reduce the signal-receiving capacity of the system or may interrupt the operation of the system.

The mobile station may receive a transmission-power control signal that is erroneous, causing the mobile station to transmit a signal at an increased power, though the data should be transmitted at a reduced power. If this is the case, the signal is inevitably amplified to a higher level and transmitted from the mobile station. In the base station, which receives radio waves from the other mobile stations, too, the interference-wave power increases with respect to the signals received from the other mobile stations. Consequently, the signals received from the other mobile stations are degraded in quality, possibly resulting in an interruption of data communication. Further, the increase in interference-wave power may decrease the number of mobile stations that can be incorporated in the system.

Conversely, the transmission-power control signal that the mobile station has received is erroneous, causing the mobile station to transmit a signal at a decreased power, though the data should be transmitted at an increased power. In the base station, which receives radio waves from the other mobile stations, too, the signal received from the mobile station falls in level with respect to the interference-wave power from the other mobile stations. Consequently, the signal received from the mobile station is degraded in quality, possibly resulting in an interruption of data communication.

SUMMARY OF THE INVENTION

Accordingly, an object of this invention is to provide a CDMA mobile communications system in which any mobile station can measure the quality of the downlink and control the transmission power if the transmission-power control signal it has received has an error, thereby to stabilize the system, a method of controlling the transmission power in the system, and a mobile station for use in the system.

According to the present invention, there is provided a mobile station for use in a code-division multiple-access communications system, said mobile station comprising: a detection unit configured to receive a signal transmitted from a base station, and to detect an error of a downlink in the signal, said signal including a transmission-power control information for controlling transmission power of the mobile station; a extraction unit configured to extract the transmission-power control information from the signal; and a mobile-station transmission-power control unit configured to input a detection result of the error from said detection unit and the transmission-power control information from said extraction unit, and to control a transmission power of a radio transmission unit of the mobile station in accordance with the detection result of the error, referring to the transmission-power control information, a history of an uplink transmission power for immediately preceding m frames (m being a positive integer) and a history of the transmission-power control information for immediately preceding n frames (n being a positive integer).

Preferably, mobile-station transmission-power control unit may include: a first decision unit configured to determine whether the uplink transmission power is stable or changing, based on the history of the uplink transmission power for immediately preceding m frames; a first calculation unit configured to calculate a change in the uplink transmission power, based on the history of the uplink transmission power for immediately preceding m frames; a second calculation unit configured to calculate polarity information about the immediately preceding n frames, based on the transmission-power control information; and a second decision unit configured to compare the polarity information about the n frames with the polarity information contained in the transmission-power control information, and to determine whether the polarities are identical or different.

The mobile-station transmission-power control unit may be configured to: (i) control the radio transmission unit of the mobile station on the basis of the transmission-power control information, when said detection unit has detected no errors; (ii) control the radio transmission unit of the mobile station, thereby to maintain the uplink transmission power, when said detection unit detects the error and said first decision unit therefore determines that uplink transmission power is stable; (iii) control the radio transmission unit of the mobile station on the basis of the transmission-power control information, when the detection unit detects the error and the first decision unit therefore determines that uplink transmission power is changing, if the second decision unit determines that the polarities are identical; and (iv) control the radio transmission unit of the mobile station on the basis of the change in the uplink transmission power, which is calculated by the first calculation unit, when the detection unit detects an error and the first decision unit therefore determines that uplink transmission power is changing, if the second decision unit determines that the polarities are different.

The second calculation unit may calculate the polarity information about the immediately preceding n frames, by adding polarity information items about the transmission-power control information items for the n frames.

According to the present invention, there is provided a code-division multiple-access communications system comprising a radio base station and a mobile station, wherein said radio base station has means for receiving a signal transmitted from the mobile station and transmitting a transmission-power control signal for controlling the transmission power of the mobile station, said mobile station comprising: a detection unit configured to receive a signal transmitted from a base station, and to detect an error of a downlink in the signal, said signal including a transmission-power control information for controlling transmission power of the mobile station; a extraction unit configured to extract the transmission-power control information from the signal; and a mobile-station transmission-power control unit configured to input a detection result of the error from said detection unit and the transmission-power control information from said extraction unit, and to control a transmission power of a radio transmission unit of the mobile station in accordance with the detection result of the error, referring to the transmission-power control information, a history of an uplink transmission power for immediately preceding m frames (m being a positive integer) and a history of the transmission-power control information for immediately preceding n frames (n being a positive integer).

The mobile-station transmission-power control unit may include: a first decision unit configured to determine whether the uplink transmission power is stable or changing, based on the history of the uplink transmission power for immediately preceding m frames; a first calculation unit configured to calculate a change in the uplink transmission power, based on the history of the uplink transmission power for immediately preceding m frames; a second calculation unit configured to calculate polarity information about the immediately preceding n frames, based on the transmission-power control information; and a second decision unit configured to compare the polarity information about the n frames with the polarity information contained in the transmission-power control information, and to determine whether the polarities are identical or different.

The mobile-station transmission-power control unit may be configured to: (i) control the radio transmission unit of the mobile station on the basis of the transmission-power control information, when said detection unit has detected no errors; (ii) control the radio transmission unit of the mobile station, thereby to maintain the uplink transmission power, when said detection unit detects the error and said first decision unit therefore determines that uplink transmission power is stable; (iii) control the radio transmission unit of the mobile station on the basis of the transmission-power control information, when the detection unit detects the error and the first decision unit therefore determines that uplink transmission power is changing, if the second decision unit determines that the polarities are identical; and (iv) control the radio transmission unit of the mobile station on the basis of the change in the uplink transmission power, which is calculated by the first calculation unit, when the detection unit detects an error and the first decision unit therefore determines that uplink transmission power is changing, if the second decision unit determines that the polarities are different.

According to the present invention, there is provided a method of controlling transmission power in a code-division multiple-access communications system comprising a radio base station and a mobile station, comprising: a step in which the radio base station transmits a transmission-power control signal for controlling transmission power of the mobile station; a step in which the mobile station receives the transmission-power control signal transmitted from said radio base station; a step in which the mobile station detects an error of a downlink in the signal; a step in which the mobile station extracts the transmission-power control information from the signal; and a step in which the mobile station controls a transmission power of a radio transmission unit of the mobile station in accordance with a detection result of the error of a downlink, referring to the transmission-power control signal received, a history of a transmission power set in the past, and a history of transmission-power control signals received in the past.

According to the present invention, there is provided a method of controlling transmission power of a mobile station used in a code-division multiple-access communications system, comprising: a step in which the mobile station receives a signal containing a transmission-power control information transmitted from a base station; a step in which the mobile station detects an error of a downlink in the signal; a step in which the mobile station extracts the transmission-power control information from the signal; and a control step in which the mobile station controls a transmission power of a radio transmission unit of the mobile station in accordance with a detection result of the error in the signal, referring to the transmission-power control information obtained from the signal, a history of an uplink transmission power for immediately preceding m frames (m being a positive integer) and a history of the transmission-power control information for immediately preceding n frames (n being a positive integer).

The control step may comprise: a first step of determining whether the uplink transmission power is stable or changing, from the history of the uplink transmission power for immediately preceding m frames; a second step of calculating a change in the uplink transmission power, from the history of the uplink transmission power for immediately preceding m frames; a third step of calculating polarity information about the immediately preceding n frames, from the transmission-power control information; and a fourth step of comparing the polarity information about the n frames with the polarity information contained in the transmission-power control information, thereby to determine whether the polarities are identical or different. In the control step, (i) a radio transmission unit of the mobile station is controlled on the basis of the transmission-power control information, when the result of error detection shows no errors; (ii) the radio transmission unit of the mobile station is controlled to maintain the transmission power, when the result of error detection shows an error and the result of first step shows that uplink transmission power is stable; (iii) the radio transmission unit of the mobile station is controlled on the basis of the transmission-power control information, when the result of error detection shows an error and the result of the first step shows that uplink transmission power is changing, if the result of the fourth step shows that the polarities are identical; and (iv) the transmission power of the radio transmission unit of the mobile station is controlled on the basis of the change obtained in the second step, when the result of error detection shows an error and the result of the first step shows that uplink transmission power is changing, if the result of the fourth step shows that the polarities are different.

In this invention, each mobile station measures the quality of the downlink. If the line has no errors, the mobile station uses a transmission-power control signal transmitted from the base station, in accordance with the quality of the line. If the line has an error, the transmission power of the mobile station is controlled in accordance with the history of the transmission-power control signal received and also the history of the transmission power of the mobile station. This can prevent the CDMA mobile communications system from being degraded in quality. As a result, interruption of communication is avoided, the number of mobile stations would not decrease, and the system can be stabilized.

DETAILED DESCRIPTION OF THE PREFERRED EMBODIMENTS

An embodiment of the present invention will be described, with reference to the accompanying drawings.

Figure 1:
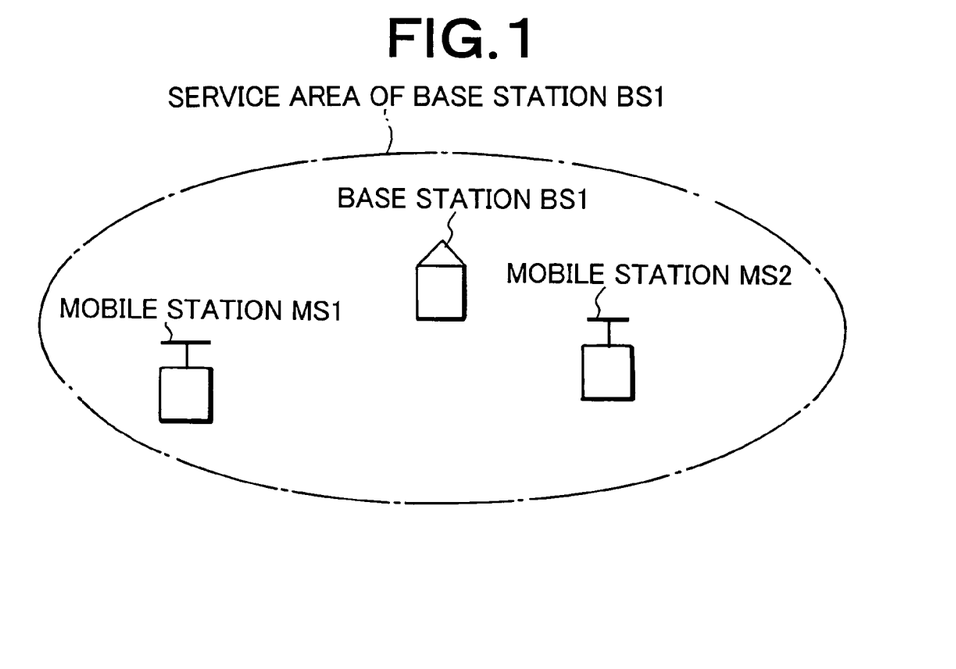
FIG. 1 is a diagram showing a mobile communications system, explaining the present invention.

FIG. 1 depicts a mobile communications system of an ordinary type. In the system, a plurality of mobile stations MS1 and MS2 exist in the service area of the base station BS1. The base station BS1 achieves CDMA communication between the mobile stations MS1 and MS2. The mobile stations MS1 and MS2 modulate signals at the same frequency, using the spread codes allocated to them. The transmission power of each mobile station MS1 and MS2 is controlled by a transmission-power control signal sent from the base station BS1.

The transmission-power control signal sent to each mobile station MS1 and MS2 from the base station BS1 is bit information that represents an up-command or a down-command generated by the base station BS1. To generate the command, the base station BS1 first performs despreading on the signal received from each mobile station MS1 and MS2, applying the spread code allocated to the mobile stations MS1 and MS2, then measures the SIR (Signal-to-Interference Ratio) in the mobile station MS1 and MS2, and compares the SIR with the target SIR. In accordance with the result of this comparison, the base station BS1 generates an up-command or a down-command. The command for each mobile station MS1 and MS2 is subjected to spread modulation in the downlink.

Figure 2:
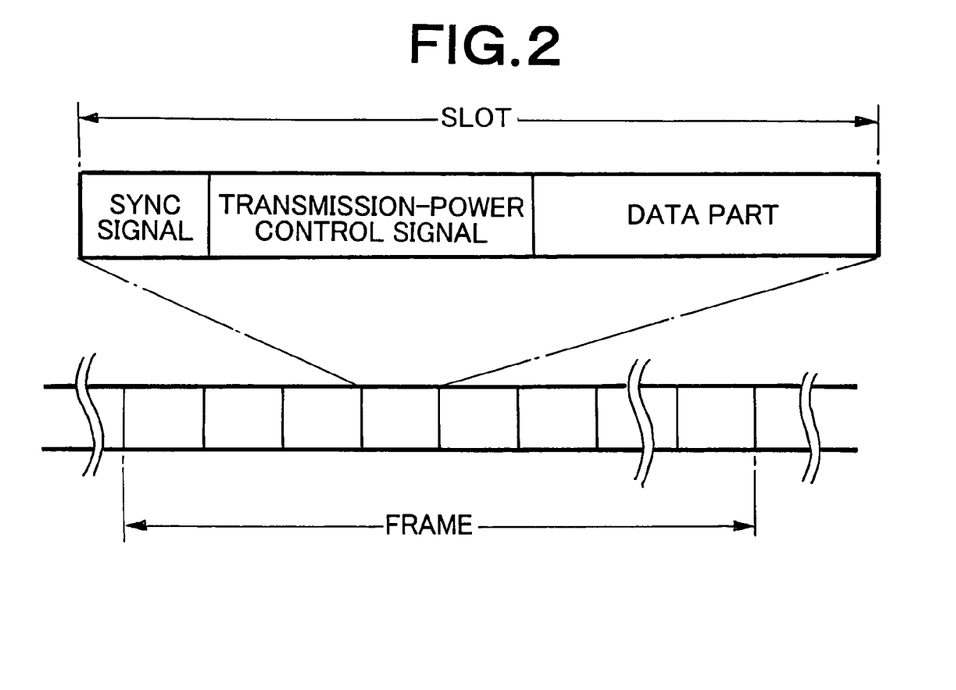
FIG. 2 is a diagram representing the format of a signal that a base station is to transmit in an embodiment of the invention.

FIG. 2 represents the format of frames sent to a downlink from the base station BS1. The frame is composed of a pre-scribed number of slots having the same time length. Each slot contains the above-mentioned transmission-power control signal, as well as a sync signal and data. The transmission-power control signal is a one-bit signal. If the bit is "1," the signal is an up-command that has positive polarity (+). If the bit is "0," the signal is a down-command that has negative polarity (−). Added to the data is a cyclic redundancy check (CRC) code that is an error-detecting code.

Figure 3:
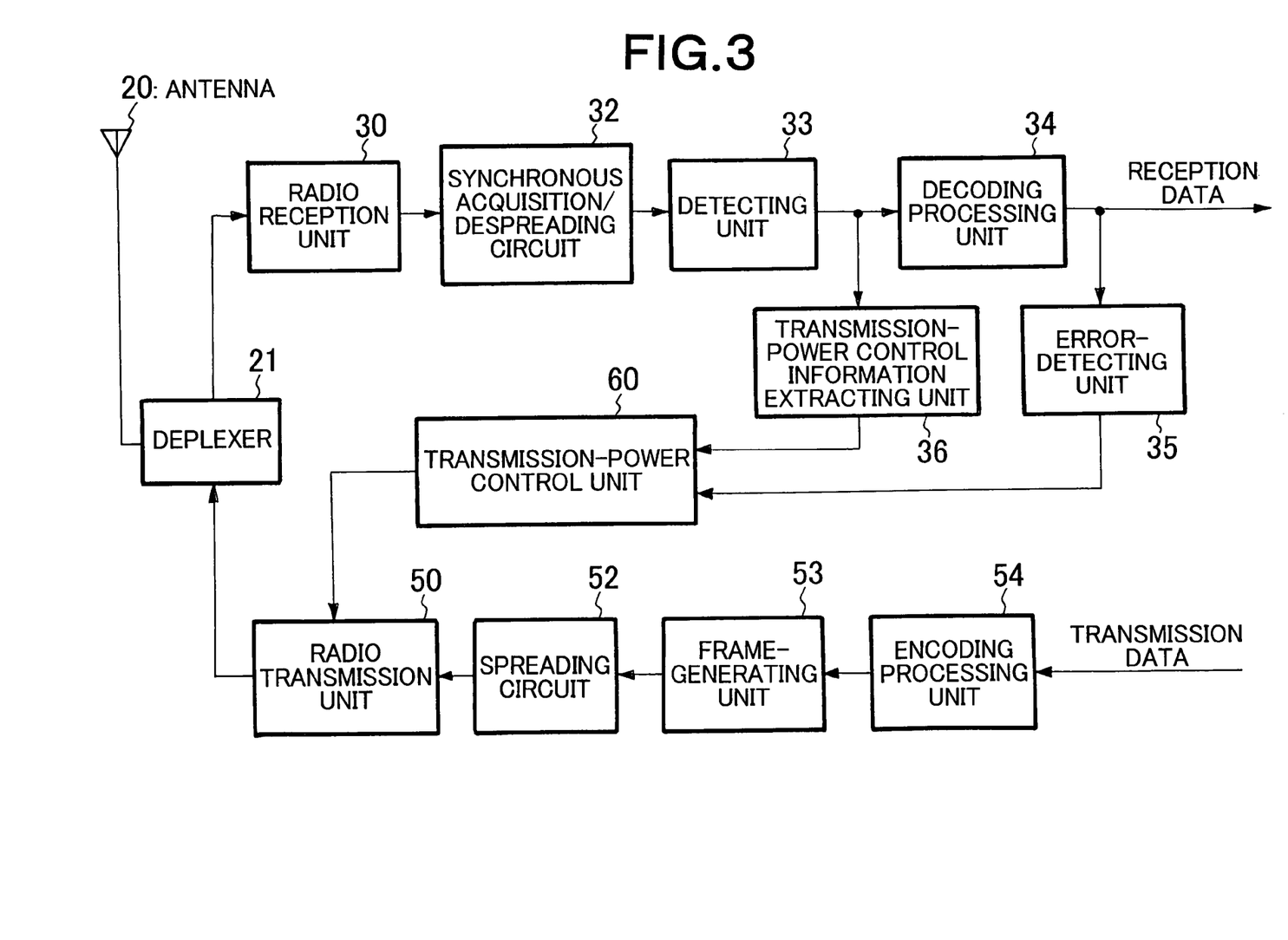
FIG. 3 shows the function blocks of a mobile station according to the embodiment of this invention.

FIG. 3 is a diagram showing the function blocks of the mobile station MS1 used in this invention. The mobile station MS2 has the same configuration as the mobile station BS1.

As seen from FIG. 3, an antenna 20 receives a radio wave transmitted from the base station BS1. The radio wave is input to a radio reception unit 30 via a duplexer 21. The radio reception unit 30 converts the input high-frequency wave to an intermediate-frequency wave. Further, the radio reception unit 30 demodulates the wave and converts the same into a base-band signal. A synchronous acquisition/despreading circuit 32 performs synchronous acquisition of the base-band signal that has been spectrum-spread. The circuit 32 then performs despreading on the signal, by using the spread code allocated to the mobile station. A detecting unit 33 carries out a wave-detecting process such as compensation for phase rotation. As a result, the signal is demodulated in the form of a digital signal.

The output of the detecting unit 33 is input to a transmission-power control information extracting unit 36. The unit 36 extracts the transmission-power control signal from the time slot shown in FIG. 2. The output of the detecting unit 33 is input to a decoding processing unit 34, too. The unit 34 decodes the data contained in the slot, generating a decoded signal. The decoded signal is used as received data and converted to, for example, an audio signal. In the process of decoding the data, an error-detecting unit 35 determines whether the data has an error or not, from the error-detection code embedded in the data section of the slot. The transmission-power control information is supplied from the unit 36 to a transmission-power control unit 60. Meanwhile, an error detection signal is supplied from the error-detecting unit 35 to the transmission-power control unit 60.

The transmission-power control unit 60 controls the power that should be supplied from a radio transmission unit of the mobile station MS1 to the base station BS1, in accordance with the transmission-power control information received by the mobile station MS1 and in accordance with whether the data has an error or not.

An encoding processing unit 54 encodes the data to be transmitted from the mobile station BS1, which includes the error-detection information. A frame-generating unit 53 generates a frame that contains the sync code for the data to be transmitted and the transmission-power control information. A spreading circuit 52 performs a spreading process, using the spread code allocated to the mobile station. The resultant signal, which has been spectrum-spread in terms of band, is supplied to a radio transmission unit 50.

Figure 4:
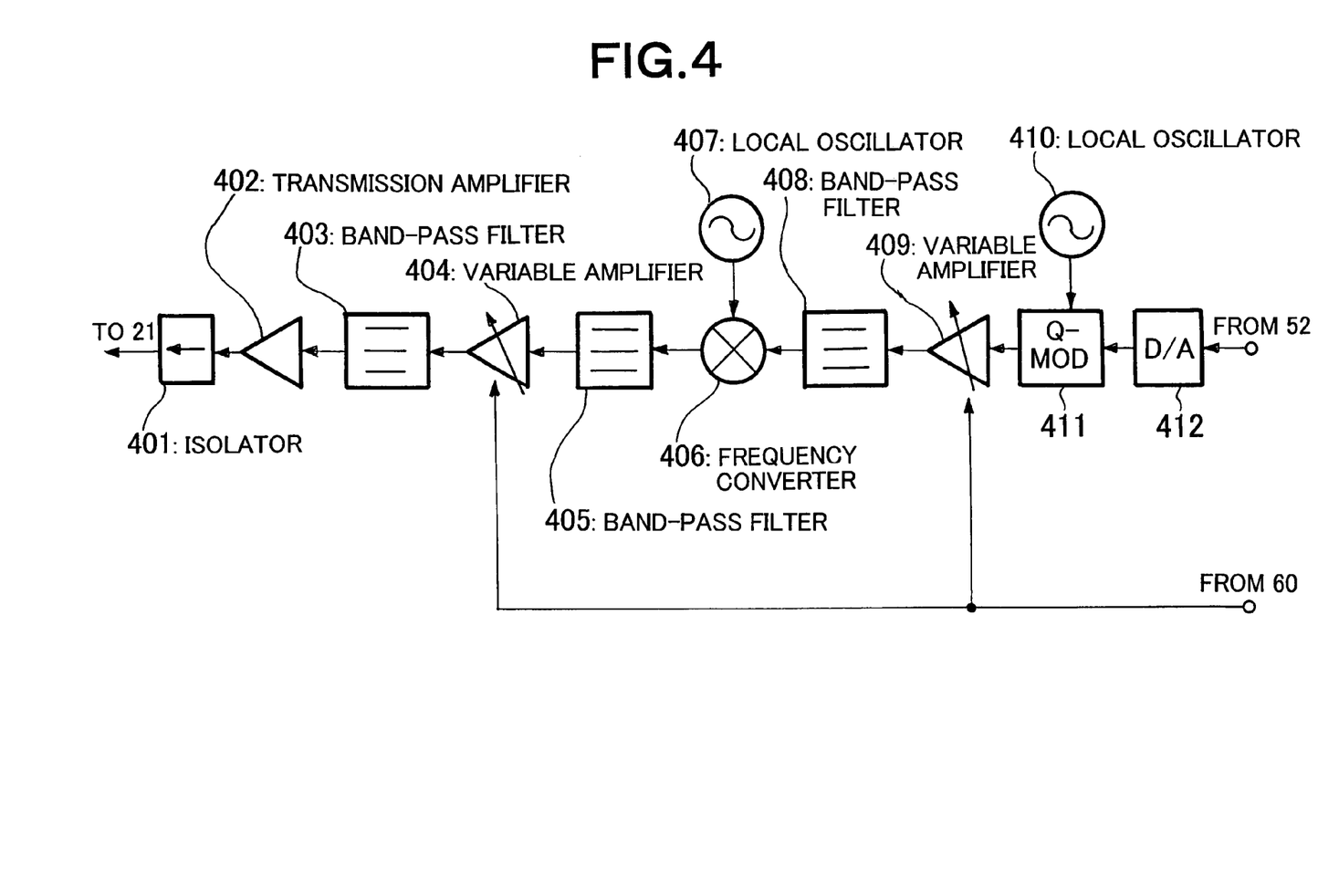
FIG. 4 is a functional block diagram of the radio transmission unit used in the mobile station according to the embodiment of the invention.

FIG. 4 is a functional block diagram of the radio transmission unit 50. As shown in FIG. 4, a D/A converter 412 converts the output of the spreading circuit 52 to an analog signal. The analog signal is input to an orthogonal modulator 411. Meanwhile, an analog signal having a broad-band spread spectrum modulates the local frequency of the signal supplied from a local oscillator 410. The output modulated is amplified by a variable amplifier 409. A band-pass filter 408 filters out the unnecessary component of the output from the amplifier 409. The output of the filter 408 is supplied to a frequency converter 406. The frequency converter 406 performs up-conversion so that the high-frequency signal output from the local oscillator 407 may be transmitted in the form of a radio wave. A band-pass filter 405 filters out the unnecessary band of the output. The output of the frequency converter 406 is power-amplified by a variable amplifier 404. A band-pass filter 403 filters out the unnecessary component of the output. The output of the filter 403 is amplified by a transmission amplifier 402. The output thus amplified is supplied via an isolator 401 to the duplexer 21. In the radio transmission unit 50, the variable amplifiers 404 and 409 are controlled by a control signal supplied from the transmission-power control unit 60.

Figure 5:
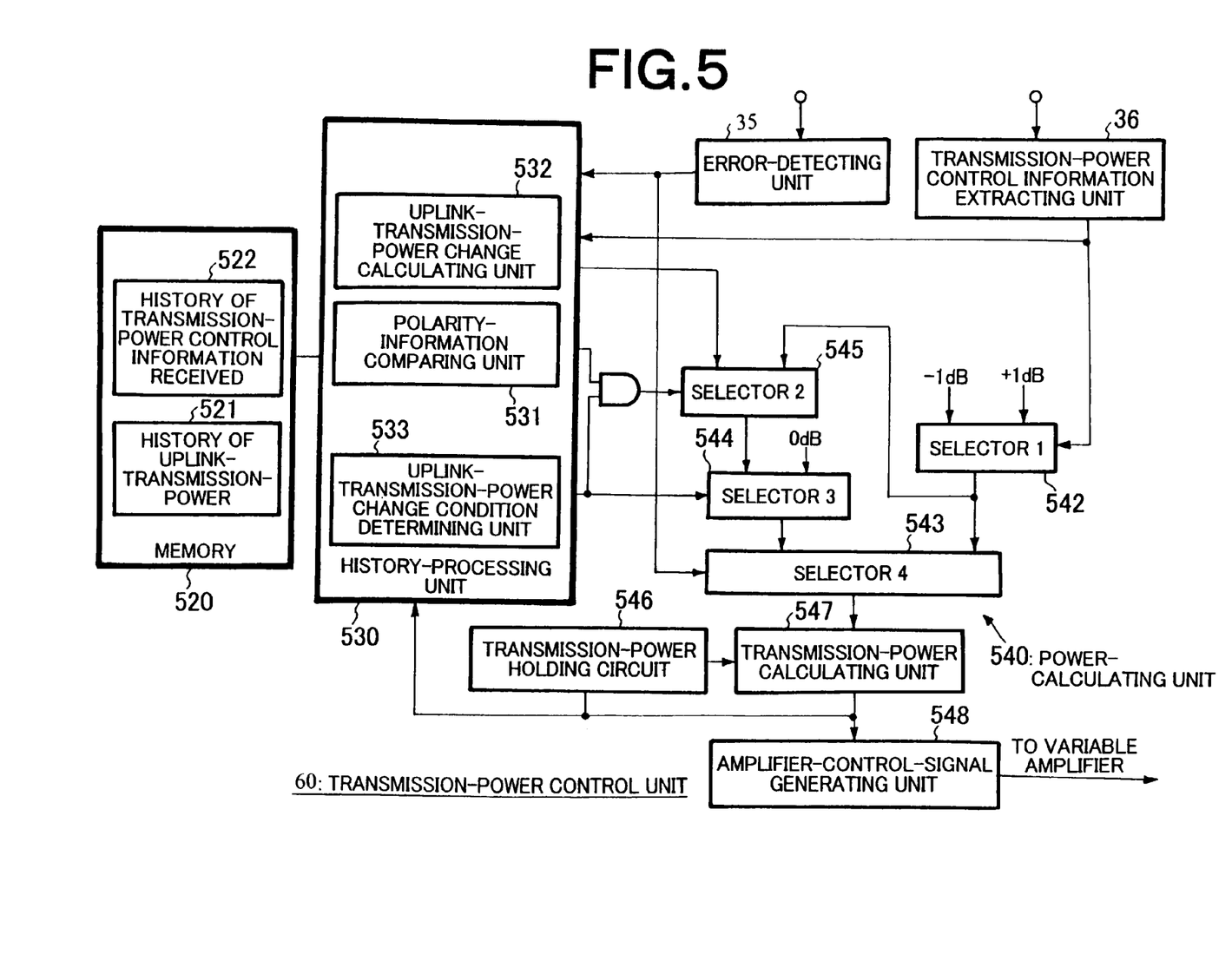
FIG. 5 is a functional block diagram of the transmission-power control unit used in the embodiment of the invention.

Before the transmission-power control unit 60 is described in detail with reference to the functional block diagram of FIG. 5, the control that the unit 60 performs will be explained, with reference to the flowchart of FIG. 6.

Figure 6:
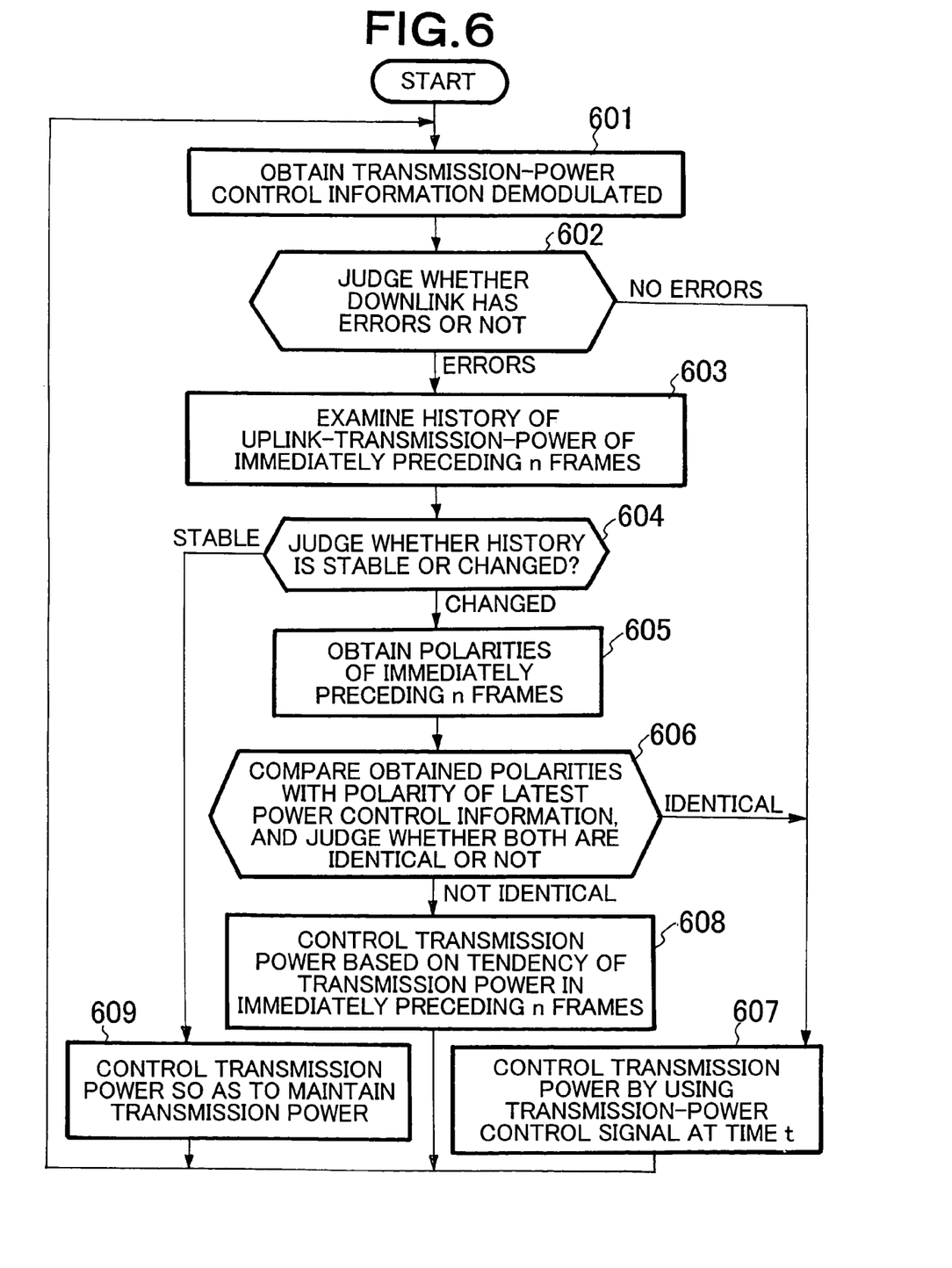
FIG. 6 is a flowchart explaining a method of controlling the transmission power in the embodiment of the invention.

As shown in FIG. 6, the unit 60 acquires in Step 601 the transmission-power control information that has been received and demodulated. Then, the unit 60 determines whether the data in the time slot containing the transmission-power control information has an error or not (Step 602).

If the data has no errors, the unit 60 controls the transmission power of the mobile station MS1 by using the transmission-power control signal at the present time t (Step 607). Thereafter, the operation returns to Step 601. The unit 60 acquires the transmission-power control information contained in the next time slot received.

If it is determined in Step 602 that the data has an error, the unit 60 examines the history of the uplink transmission power that the mobile station MS1 has transmitted for the immediately preceding n frames (Step 603). In Step 604, the unit 60 determines whether the history of the transmission power remains stable or has changed. If the history of uplink transmission power is stable, the operation goes to Step 609. In Step 609, the unit 60 performs a transmission-power control, thus maintaining the transmission power that the mobile station MS1 has transmitted in the immediately preceding time slot.

In Step 604, the unit 60 may determine that the history of transmission power has changed. In this case, the unit 60 acquires the history of the polarity of the transmission-power control information for the immediately preceding n frames (Step 605). The unit 60 compares the polarity with the polarity of the latest transmission-power control information it has received (Step 606). If the polarities compared are identical, the operation goes to Step 607. In Step 607, the unit 60 controls the transmission power of the mobile station MS1 in accordance with the transmission-power control information received at the present time t.

If the polarities compared are not identical, the unit 60 controls the transmission power of the mobile station in the same way as it did for the immediately preceding n frames from the present time t (Step 608).

This control will be described in greater detail, with reference to FIG. 5. As FIG. 5 shows, the transmission-power control unit 60 includes a history-processing unit 530, a memory 520, a power-calculating unit 540, and an amplifier-control-signal generating unit 548. The power-calculating unit 540 has a selector 542, which receives a signal from the unit 36 that extracts transmission-power control information. The selector 542 selects +1 db if the signal is "1," and −1 db if the signal is "0." The output signal of the selector is supplied to a selector 543. If the data contained in the time slot transmitted from the base station has no errors, this signal is supplied via the selector 543 to a transmission-power calculating unit 547. The transmission-power calculating unit 547 adds the signal to the power value supplied from a transmission-power holding circuit 546, generating a sum signal. The sum signal is supplied to the amplifier-control-signal generating unit 548. The unit 548 converts the sum signal to a control signal for controlling the amplifier of the radio transmission unit. Hence, the transmission unit 50 transmits a radio wave from the antenna 20 at the power controlled by the transmission-power control information that the radio transmission unit 50 has received.

The transmission-power holding circuit 546 holds the transmission-power value for the radio transmission unit 50, concerning the slot immediately preceding the present slot. For the next time slot, a value to which the value supplied from the selector 543 has been added is written over the transmission-power value. Therefore, the circuit 546 holds the power value for the immediately preceding slot to which new transmission-power control information is supplied.

The power value from the transmission-power calculating unit 547 is stored in an area 521 of the memory 520, provided for the uplink transmission power history through the history-processing unit 530. In this area 521, there are stored the power values for slots over n frames. Whenever the power value for a new slot is supplied into this area 521, the data for the oldest slot is erased. Thus, the power values for slots of the latest n frames are stored in the area 521.

The transmission-power control information received is supplied from a transmission-power control information extracting unit 36. The information is supplied via the history-processing unit 530 to the memory 520 and is stored in an area 522 of the memory 520, which is provided to hold the history of the transmission-power control information. This process is repeated every time the unit 36 extracts the transmission-power control information. This area 522 holds the transmission-power control information for slots over n frames. When a new information item is stored in the area 522, the oldest information item is erased in the area 522. Thus, the area 522 always holds the transmission-power control information for the latest n frames. The area 522 holds the polarity information about n frames, along with the transmission-power control information about each slot. The polarity information represents the total positive (+) or negative (−) polarity of n frames, i.e., the sum of the polarities of the transmission-power control information items about the n frames. The transmission-power control information for n frames has a positive (+) polarity or a negative (−) polarity, in accordance with the sum of the polarities of transmission-power control information items for time slots over n frames.

The slot received by the error-detecting unit 35 may have an error. In this case, the selector 543 selects the output of a selector 544. The output of the error-detecting unit 35 is supplied to the history-processing unit 530, too. Then, a uplink-transmission-power change condition determining unit 533 refers to the uplink-transmission-power history stored in the memory 520, and determines the variation of the transmission power that the mobile station MS1 has transmitted for the latest n frames. If the unit 533 determines that the transmission power remains stable, the selector 543 selects 0 db input to the selector 544. This signal is supplied to the transmission-power calculating unit 547. The unit 547 adds "0," and the output value of the unit 547 remains unchanged. Therefore, the power transmitted from the mobile station MS1 is maintained.

Figure 7:
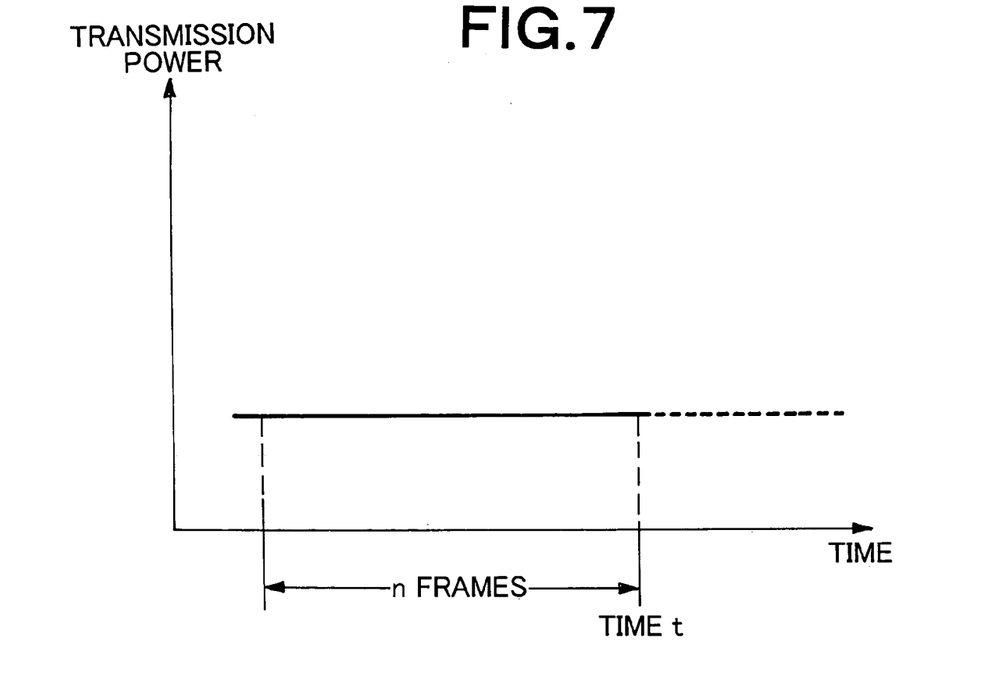
FIG. 7 is a diagram illustrating a history of transmission power in each mobile station, and explaining the embodiment of the present invention.

The transmission power remains stable as in the case where the mobile station transmits transmission power that is stable for the immediately preceding n frames, as is illustrated in FIG. 7. That is, the transmission power is stable if the mobile station stays at the same position, not moving at all. At time t, too, a control is made in order to hold the transmission power.

If the unit 533 determines that the uplink transmission power is unstable, the selector 544 selects the output of a selector 545. If the power is found unstable, in the history-processing unit 530, a polarity-information comparing unit 531 compares the polarity information about the transmission-power control information with the polarity information about the time slots for the immediately preceding n frames. If the items of polarity information compared are identical, the selector 545 selects the output of the selector 542. In this case, the transmission-power control information received at the present time slot is supplied to the transmission-power calculating unit 547 through the selectors 545, 544 and 543. As a result, the transmission power in the mobile station MS1 is controlled in accordance with the transmission-power control information received.

If the polarity-information comparing unit 531 finds that the items of polarity information are not identical, the selector 545 selects the line extending from the history-processing unit 530. To this line, there has been output the transmission-power change for the immediately preceding n frames, from a uplink-transmission-power change calculating unit 532. Hence, if the items of polarity information are not identical, the data representing the power change is supplied to the transmission-power calculating unit 547 and added to the power value for the immediately preceding time slot of the transmission-power holding circuit 546. Thus, the transmission-power calculating unit 547 calculates the power at which data should be transmitted from the mobile station MS1.

Figure 8:
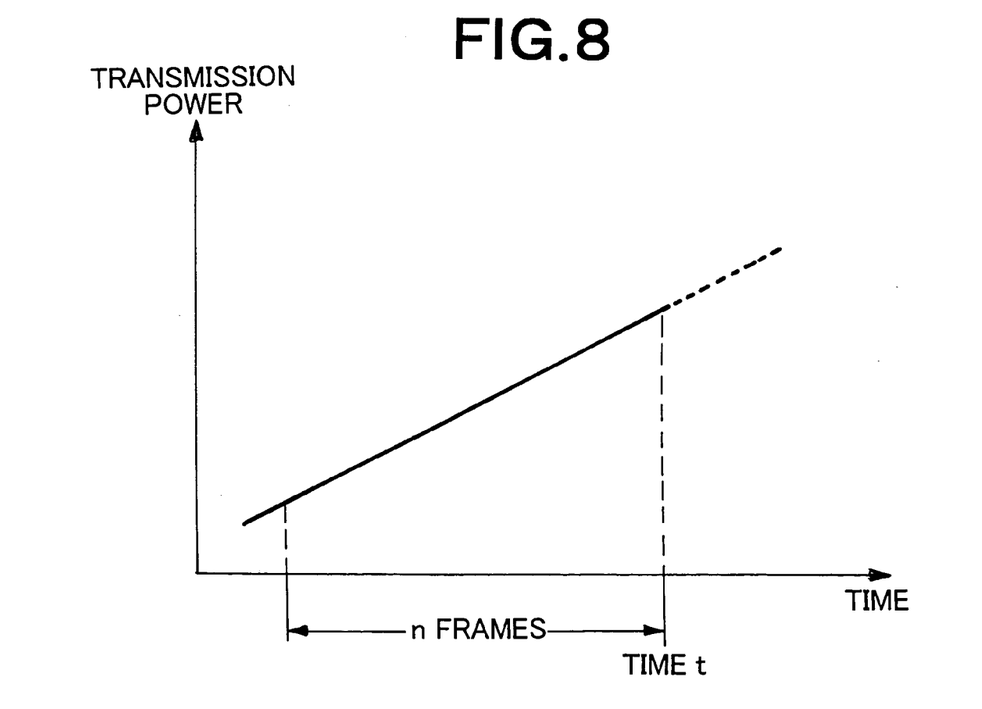
FIG. 8 is a diagram illustrating another history of the transmission power in each mobile station, and explaining the embodiment of the present invention.

The immediately preceding n frames may change, rendering the polarity information items not identical. This may happen when the mobile station MS1, for example, is moving away from the base station BS1 as shown in FIG. 8. The transmission power, at which the mobile station MS1 transmits the intermediately preceding n frames, therefore gradually increases. In this case, the uplink-transmission-power change calculating 532 shown in FIG. 5 calculates, even at time t, the change from the tendency of control of the transmission power of the intermediately preceding n frames. The data representing this change is output from the transmission-power calculating unit 547 to the amplifier-control-signal generating unit 548. The unit 548 generates a control signal corresponding to this data.

FIG. 8 shows the case where the mobile station MS1 moves away from the base station BS1, whereby the transmission power increases at a constant rate. The present invention is not limited to this case, nonetheless. It can be applied to the case where the power at which n frames are transmitted decreases. In this case, the change can be a value obtained by dividing the power change for n frames, by the slot for the n frames.

In the embodiment described above, the history of transmission-power control information and the history of uplink transmission power are examined, each for a number of frames transmitted immediately before the present time t. This number may be n (i.e., a positive integer) for the history of transmission-power control information, and may be m (i.e., a positive integer) for the history of uplink transmission power.

In the description of the embodiment, the base station is not described in detail. The base station may be of the type that is illustrated in FIG. 9.

As has been described, in this invention, the mobile station measures the quality of the downlink. If the downlink has no errors, the power of the mobile station is controlled by the transmission-power control signal sent from the base station. If the downlink has an error, the power is controlled in accordance with the history of the transmission-power control signal and the history of the transmission power of the mobile station. The present invention can therefore prevent a CDMA mobile communications system from being degraded in quality, interruption of communication from occurring, and the number of mobile stations from decreasing. Thus, this invention can stabilize the system.

What is claimed is:

1. A mobile station for use in a code-division multiple-access communications system, said mobile station comprising:
    a detection unit configured to receive a signal transmitted from a base station, and to detect an error of a downlink in the signal, said signal including a transmission-power control information for controlling transmission power of the mobile station;
    an extraction unit configured to extract the transmission-power control information from the signal; and
    a mobile-station transmission-power control unit configured to input a detection result of the error from said detection unit and the transmission-power control information from said extraction unit, and to control a transmission power of a radio transmission unit of the mobile station in accordance with the detection result of the error, referring to the transmission-power control information, a history of an uplink transmission power for immediately preceding m frames (m being a positive integer) and a history of the transmission-power control information for immediately preceding n frames (n being a positive integer).

2. The mobile station according to claim 1, wherein said mobile-station transmission-power control unit includes:
    a first decision unit configured to determine whether the uplink transmission power is stable or changing, based on the history of the uplink transmission power for immediately preceding m frames;
    a first calculation unit configured to calculate a change in the uplink transmission power, based on the history of the uplink transmission power for immediately preceding m frames;
    a second calculation unit configured to calculate polarity information about the immediately preceding n frames, based on the transmission-power control information; and
    a second decision unit configured to compare the polarity information about the n frames with the polarity information contained in the transmission-power control information, and to determine whether the polarities are identical or different.

3. The mobile station according to claim 2, wherein said mobile-station transmission-power control unit is configured to:
    (i) control the radio transmission unit of the mobile station on the basis of the transmission-power control information, when said detection unit has detected no errors;
    (ii) control the radio transmission unit of the mobile station, thereby to maintain the uplink transmission power, when said detection unit detects the error and said first decision unit therefore determines that uplink transmission power is stable;
    (iii) control the radio transmission unit of the mobile station on the basis of the transmission-power control information, when the detection unit detects the error and the first decision unit therefore determines that uplink transmission power is changing, if the second decision unit determines that the polarities are identical; and
    (iv) control the radio transmission unit of the mobile station on the basis of the change in the uplink transmission power, which is calculated by the first calculation unit, when the detection unit detects an error and the first decision unit therefore determines that uplink transmission power is changing, if the second decision unit determines that the polarities are different.

4. The mobile station according to claim 2, wherein said second calculation unit calculates the polarity information about the immediately preceding n frames, by adding polarity information items about the transmission-power control information items for the n frames.

5. The mobile station according to claim 3, wherein said second calculation unit calculates the polarity information about the immediately preceding n frames, by adding polarity information items about the transmission-power control information items for the n frames.

6. The mobile station according to claim 1, wherein said n and m are equal.

7. The mobile station according to claim 1, wherein said mobile-station transmission-power control unit includes:
a memory configured to store the history of the uplink transmission power for immediately preceding m frames in m storage regions of the memory,
wherein information corresponding to the uplink transmission power for a current frame stored in the memory overwrites the information corresponding to the uplink transmission power for an immediately preceding $m+1^{st}$ frame that was stored in the memory.

8. The mobile station according to claim 7, wherein the memory stores the history of the uplink transmission power for only the immediately preceding m frames and no other frames.

9. A code-division multiple-access communications system comprising a radio base station and a mobile station, wherein said radio base station has means for receiving a signal transmitted from the mobile station and transmitting a transmission-power control signal for controlling the transmission power of the mobile station, said mobile station comprising:
a detection unit configured to receive a signal transmitted from a base station, and to detect an error of a downlink in the signal, said signal including a transmission-power control information for controlling transmission power of the mobile station;
a extraction unit configured to extract the transmission-power control information from the signal; and
a mobile-station transmission-power control unit configured to input a detection result of the error from said detection unit and the transmission-power control information from said extraction unit, and to control a transmission power of a radio transmission unit of the mobile station in accordance with the detection result of the error, referring to the transmission-power control information, a history of an uplink transmission power for immediately preceding m frames (m being a positive integer) and a history of the transmission-power control information for immediately preceding n frames (n being a positive integer).

10. The code-division multiple-access communications system according to claim 9, wherein said mobile-station transmission-power control unit includes:
a first decision unit configured to determine whether the uplink transmission power is stable or changing, based on the history of the uplink transmission power for immediately preceding m frames;
a first calculation unit configured to calculate a change in the uplink transmission power, based on the history of the uplink transmission power for immediately preceding m frames;
a second calculation unit configured to calculate polarity information about the immediately preceding n frames, based on the transmission-power control information; and
a second decision unit configured to compare the polarity information about the n frames with the polarity information contained in the transmission-power control information, and to determine whether the polarities are identical or different.

11. The code-division multiple-access communications system according to claim 10, wherein said mobile-station transmission-power control unit is configured to:
(i) control the radio transmission unit of the mobile station on the basis of the transmission-power control information, when said detection unit has detected no errors;
(ii) control the radio transmission unit of the mobile station, thereby to maintain the uplink transmission power, when said detection unit detects the error and said first decision unit therefore determines that uplink transmission power is stable;
(iii) control the radio transmission unit of the mobile station on the basis of the transmission-power control information, when the detection unit detects the error and the first decision unit therefore determines that uplink transmission power is changing, if the second decision unit determines that the polarities are identical; and
(iv) control the radio transmission unit of the mobile station on the basis of the change in the uplink transmission power, which is calculated by the first calculation unit, when the detection unit detects an error and the first decision unit therefore determines that uplink transmission power is changing, if the second decision unit determines that the polarities are different.

12. The code-division multiple-access communications system according to claim 9, wherein said mobile-station transmission-power control unit includes:
a memory configured to store the history of the uplink transmission power for immediately preceding m frames in m storage regions of the memory,
wherein information corresponding to the uplink transmission power for a current frame stored in the memory overwrites the information corresponding to the uplink transmission power for an immediately preceding $m+1^{st}$ frame that was stored in the memory.

13. The code-division multiple-access communications system according to claim 12, wherein the memory stores the history of the uplink transmission power for only the immediately preceding m frames and no other frames.

14. A method of controlling transmission power in a code-division multiple-access communications system comprising a radio base station and a mobile station, comprising:
a step in which the radio base station transmits a transmission-power control signal for controlling transmission power of the mobile station;
a step in which the mobile station receives the transmission-power control signal transmitted from said radio base station;
a step in which the mobile station detects an error of a downlink in the signal;
a step in which the mobile station extracts the transmission-power control information from the signal; and
a step in which the mobile station controls a transmission power of a radio transmission unit of the mobile station in accordance with a detection result of the error of a downlink, referring to the transmission-power control signal received, a history of a transmission power set in the past, and a history of transmission-power control signals received in the past.

15. A method of controlling transmission power of a mobile station used in a code-division multiple-access communications system, comprising:
   a step in which the mobile station receives a signal containing a transmission-power control information transmitted from a base station;
   a step in which the mobile station detects an error of a downlink in the signal;
   a step in which the mobile station extracts the transmission-power control information from the signal; and
   a control step in which the mobile station controls a transmission power of a radio transmission unit of the mobile station in accordance with a detection result of the error in the signal, referring to the transmission-power control information obtained from the signal, a history of an uplink transmission power for immediately preceding m frames (m being a positive integer) and a history of the transmission-power control information for immediately preceding n frames (n being a positive integer).

16. The method according to claim 15, wherein said control step comprising:
   a first step of determining whether the uplink transmission power is stable or changing, from the history of the uplink transmission power for immediately preceding m frames;
   a second step of calculating a change in the uplink transmission power, from the history of the uplink transmission power for immediately preceding m frames;
   a third step of calculating polarity information about the immediately preceding n frames, from the transmission-power control information; and
   a fourth step of comparing the polarity information about the n frames with the polarity information contained in the transmission-power control information, thereby to determine whether the polarities are identical or different, wherein (i) a radio transmission unit of the mobile station is controlled on the basis of the transmission-power control information, when the result of error detection shows no errors;
   (ii) the radio transmission unit of the mobile station is controlled to maintain the transmission power, when the result of error detection shows an error and the result of first step shows that uplink transmission power is stable;
   (iii) the radio transmission unit of the mobile station is controlled on the basis of the transmission-power control information, when the result of error detection shows an error and the result of the first step shows that uplink transmission power is changing, if the result of the fourth step shows that the polarities are identical; and
   (iv) the transmission power of the radio transmission unit of the mobile station is controlled on the basis of the change obtained in the second step, when the result of error detection shows an error and the result of the first step shows that uplink transmission power is changing, if the result of the fourth step shows that the polarities are different.

17. The method according to claim 15, wherein said control step comprises:
   storing, in a memory, the history of the uplink transmission power for immediately preceding m frames in m storage regions of the memory; and
   overwriting, with information corresponding to the uplink transmission power for a current frame stored in the memory, information corresponding to the uplink transmission power for an immediately preceding $m+1^{st}$ frame that was stored in the memory.

18. The method according to claim 17, wherein the storing step stores in the memory the history of the uplink transmission power for only the immediately preceding m frames and no other frames.

* * * * *